(12) United States Patent
Battyani et al.

(10) Patent No.: US 10,168,730 B2
(45) Date of Patent: Jan. 1, 2019

(54) TECHNIQUE FOR SUB-MICROSECOND LATENCY MEASUREMENT ACROSS A BUS

(71) Applicant: NovaSparks. S.A., Paris (FR)

(72) Inventors: Marc Battyani, Arlington, MA (US); Jonathan Clairembault, Rochelle (FR); Long Xu, Villejuif (FR)

(73) Assignee: NovaSparks. S.A., Paris (FR)

( * ) Notice: Subject to any disclaimer, the term of this patent is extended or adjusted under 35 U.S.C. 154(b) by 506 days.

(21) Appl. No.: 14/202,343

(22) Filed: Mar. 10, 2014

(65) Prior Publication Data

US 2014/0258766 A1    Sep. 11, 2014

Related U.S. Application Data

(60) Provisional application No. 61/774,607, filed on Mar. 8, 2013.

(51) Int. Cl.
*G06F 1/04* (2006.01)
(52) U.S. Cl.
CPC .................................... *G06F 1/04* (2013.01)
(58) Field of Classification Search
CPC ....................................................... G06F 1/04
See application file for complete search history.

(56) References Cited

U.S. PATENT DOCUMENTS

| | | | | |
|---|---|---|---|---|
| 6,246,376 B1* | 6/2001 | Bork | ...................... | G01S 1/047 342/357.34 |
| 7,188,060 B1* | 3/2007 | Adcock | .................... | G06F 1/14 703/14 |
| 7,681,199 B2* | 3/2010 | Gootherts | ............. | G06F 9/4843 713/400 |
| 8,700,805 B2* | 4/2014 | Na | .................... | H04W 56/0015 375/354 |
| 8,949,648 B2* | 2/2015 | Peng | ..................... | H04J 3/0673 713/400 |
| 2012/0117564 A1* | 5/2012 | Friebel | ................ | G06F 9/45541 718/1 |

OTHER PUBLICATIONS

Gallant, Daniel; Choose The Optimum Clock Source for PCI Express Applications; Electronic Design; http://electronicdesign.com/print/communications/choose-optimum-clock-source-pci-express-applications.

* cited by examiner

*Primary Examiner* — Mark Connolly
*Assistant Examiner* — Mohammad A Rahman
(74) *Attorney, Agent, or Firm* — Bond Schoeneck & King, PLLC; George McGuire; Jonathan Gray

(57) ABSTRACT

Methods and systems for determining latency across a bus, such as a PCIe bus, coupling a field programmable gate array (FPGA) and a processor having different time incrementation rates. Both the FPGA and the processor count clock ticks independently, and using a calibration offset and the two incrementation rates, the processor converts the FPGA clock ticks into processor clock ticks in order to determine latency across the bus.

21 Claims, 2 Drawing Sheets

TECHNIQUE FOR SUB-MICROSECOND LATENCY MEASUREMENT ACROSS A BUS

CROSS-REFERENCE TO RELATED APPLICATIONS

Figure 1:
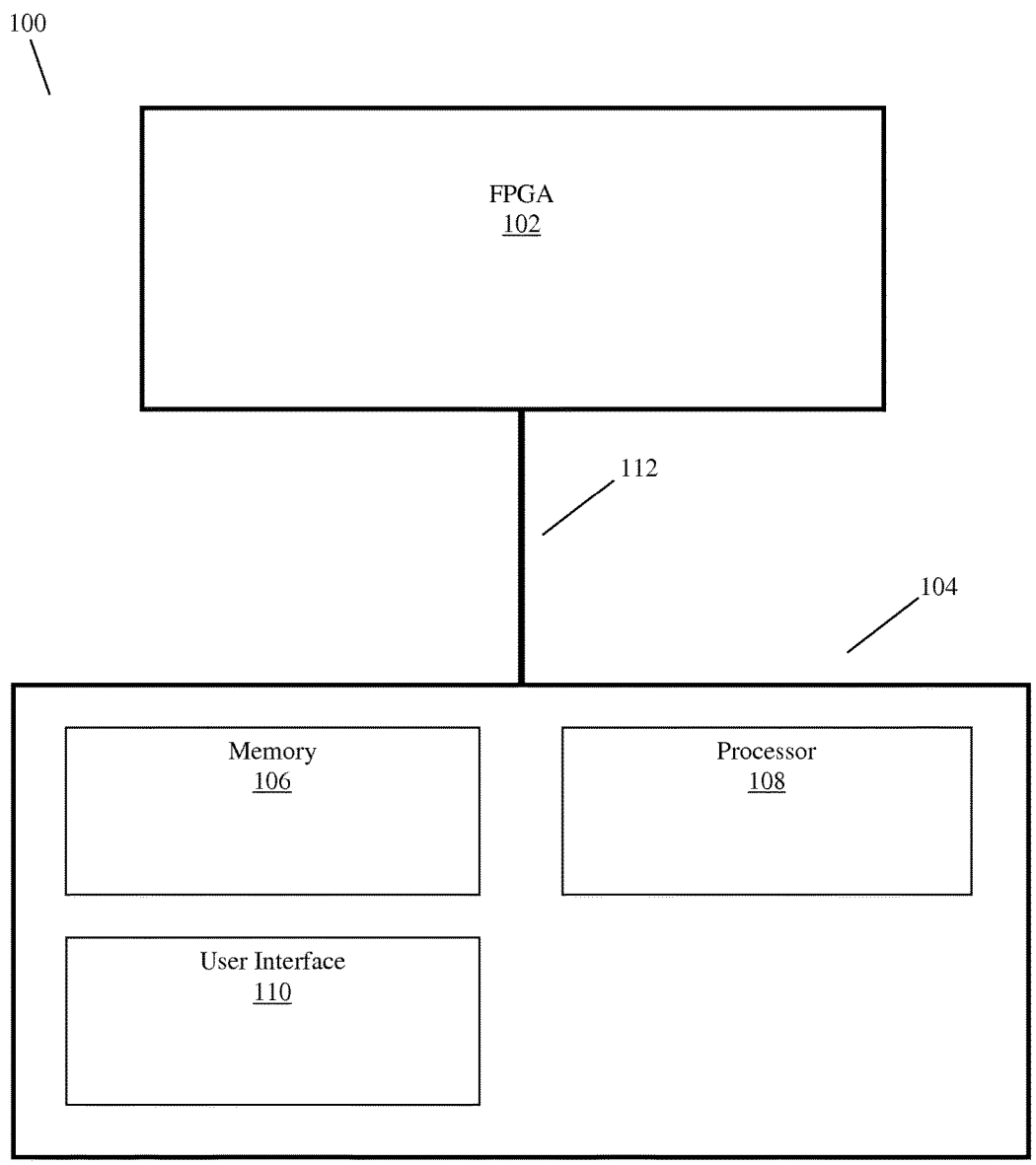

This application claims priority to U.S. Provisional Patent Application Ser. No. 61/774,607, filed on Mar. 8, 2013 and entitled "Technique for sub-microsecond latency measurement across a PCIe bus," the entire disclosure of which is incorporated herein by reference.

BACKGROUND

The present invention relates to methods and systems for measuring the latency between two points connected by a bus with a reference clock synchronous to a processor clock, such as, for example, a PCI Express ("PCIe") bus, and, more particularly, to methods and systems for accurately measuring latency between two points connected by a PCI Express bus in a combined field programmable gate array ("FPGA") and conventional processor ("CPU") processing system.

The advent of FPGA based co-processors for conventional commodity servers has led to a number of issues regarding accurate and high precision processing time measurement.

In systems with computation occurring in both an FPGA as well as a CPU, each with their own independent timing, measuring point to point latencies between both the FPGA and CPU segments is non-trivial due to, for example, clock drift and the difficulty in achieving accurate synchronization during calibration.

As an example of latency concerns, in a system such as financial market data processing, the market data to be processed enters the system via an Ethernet or other connection directly to the FPGA. Once the FPGA has completed its processing, data is then passed to a CPU over a PCIe bus for further processing within or by a trading algorithm.

The amount of time that expires during the FPGA processing is typically measured within the FPGA itself by instantiating a regularly clocked counter. Likewise, in the CPU, Time Stamp Counter ("TSC") instructions allow checking of a similar regularly clocked counter for measuring times.

However, in measuring time for a combined system, problems occur since the rate at which the FPGA and CPU counters increments can be different. Furthermore, the counters begin at different times. Even if the rate difference and start times can be accounted for in the system, independently running clocks quickly drift out of synchronization, among other concerns. This raises challenges when timing the complete processing from the input of Ethernet data into the FPGA, across the PCIe bus, into a trading algorithm running in the CPU.

Accordingly, there is a continued need for systems and methods that accurately measure latency between two points connected by a PCIe bus in a combined FPGA and CPU processing system.

BRIEF SUMMARY

Systems and methods for accurately measuring latency between two points connected by a PCIe bus in a combined FPGA and conventional processor processing system. According to a first aspect, a method for determining latency across a PCIe bus coupling a field programmable gate array (FPGA) comprising a first counter having first clock ticks with a first incrementation rate, and a processor comprising a second counter having second clock ticks with a second incrementation rate, wherein said first and second incrementation rates are not equal, the method comprising the steps of: (i) counting, by said first counter, a plurality of first clock ticks; (ii) counting, by said second counter, a plurality of second clock ticks; (iii) determining a calibration offset; and (iv) converting, using said first and second incrementation rates and the determined calibration offset, the plurality of first clock ticks to second clock ticks.

According to a second aspect, a system for determining latency across a PCIe bus, the system comprising: (i) an FPGA having a first counter having first clock ticks with a first incrementation rate, wherein said first counter is programmed to count a plurality of first clock ticks; a processor having a second counter having second clock ticks with a second incrementation rate, wherein said first and second incrementation rates are not equal, the second counter programmed to count a plurality of second clock ticks; and a PCIe bus coupling said FPGA and said processor; wherein said processor is programmed to: (i) determine a calibration offset; and (ii) convert, using said first and second incrementation rates and the determined calibration offset, the plurality of first clock ticks to second clock ticks.

According to a third aspect, a non-transitory storage medium comprising a computer program product stored thereon, the computer program product comprising instructions to: (i) count a plurality of first clock ticks by an FPGA counter having a first incrementation rate; (ii) count a plurality of second clock ticks by a processor counter having a second incrementation rate, wherein said first and second incrementation rates are not equal, and wherein said FPGA and said processor are coupled by a PCIe bus; (iii) determine a calibration offset; and (iv) convert, using said first and second incrementation rates and the determined calibration offset, the plurality of first clock ticks to second clock ticks.

BRIEF DESCRIPTION OF THE SEVERAL VIEWS OF THE DRAWING(S)

Figure 2:
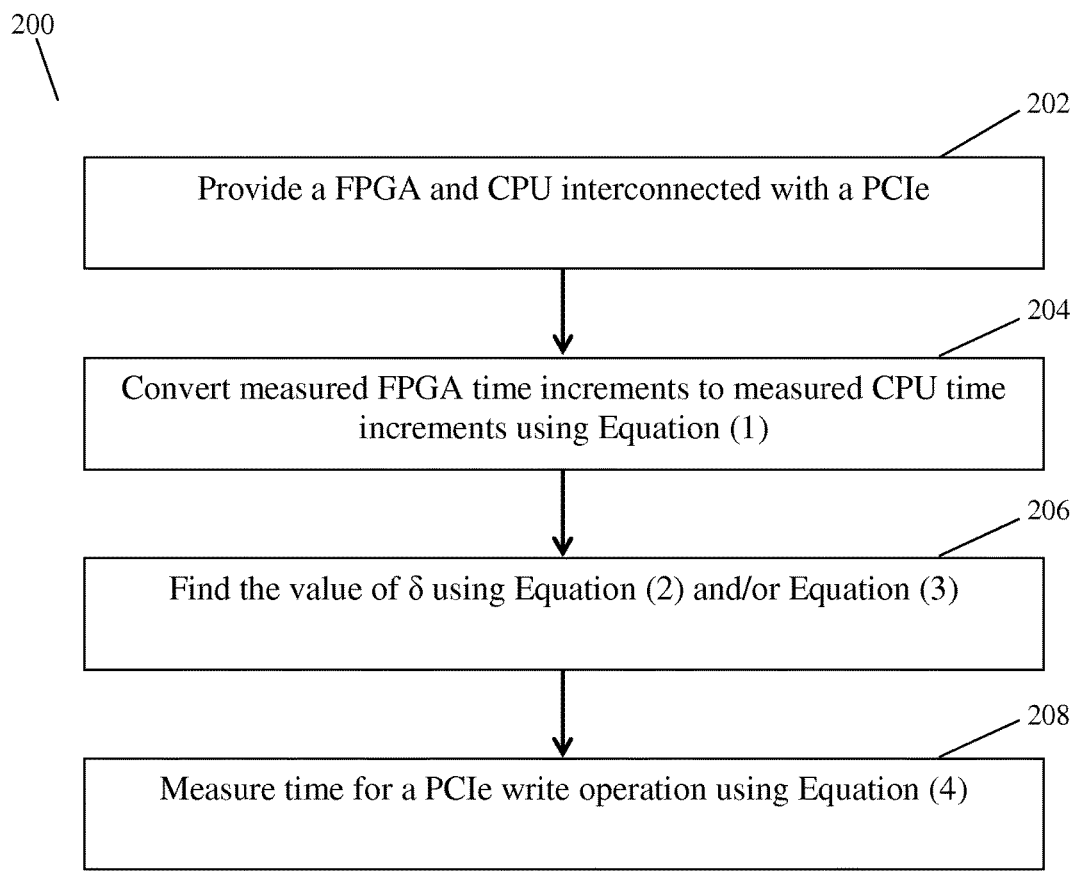

The present invention will be more fully understood and appreciated by reading the following Detailed Description in conjunction with the accompanying drawings, in which:

FIG. 1 is an FPGA/processor system containing a PCIe coupling according to an embodiment; and FIG. 2 is a method for latency determination according to an embodiment.

DETAILED DESCRIPTION

According to an embodiment are methods and systems to allow latency measurement from any two points in a combined FPGA and CPU processing system using a PCI Express bus as interconnect. This measurement is performed by novel use of a PCI Express reference clock to eliminate drift between time references in the FPGA and CPU. According to another embodiment are methods and systems to achieve accurate calibration of the measurement.

Provided herein are several embodiments which allow provision of point-to-point latency measurements in a combined FPGA/CPU computing system using a PCIe bus as interconnect. One application of a system for market data processing is used as a practical example, however the methods and systems described and envisioned herein not limited to this application, and can be used whenever precision latency measurement is required in an FPGA/CPU system across a PCIe bus.

In the particular case of the market data application, market data from a financial exchange arrives, via Ethernet, at the FPGA for processing. Each message received from the exchange has its processing time tracked through the system. The aim of applying the measurement technique described is to find the latency between packet entry and any point in the processing, even if this in the CPU. The method described allows the entry time of each packet into the FPGA to be calculated in CPU TSC ticks. By taking the difference in the TSC tick count, point to point latency can be calculated, even across a PCIe bus.

In one embodiment, a novel mechanism is used to eliminate drift between the FPGA and CPU clocks. A 100 MHz clock is present on the PCIe bus, for example, although many other types of clocks are possible. This clock is derived from the same source as the CPU TSC clock, and as such does not drift relative to it. The FPGA incorporates a counter which is incremented by a clock derived from this 100 MHz PCIe bus clock rather than one of its own internal clocks, as is typically implemented. The 100 MHz PCIe clock may be used directly to increment the counter on the FPGA, or it may pass through a further clock multiplier or divider. In the NovaSparks appliance, the value of this counter is applied to each packet as it enters the system.

A simple formula allows the value of the drift-free FPGA reference counter to be converted into TSC units. When the FPGA/CPU system is initialized, the TSC and FPGA counters begin counting ticks independently. Since TSC and FPGA counters are derived from the same source there is no drift, FPGA ticks can be converted to TSC ticks as follows in Equation (1):

$$t_{TSC} = t_{FPGA}\left(\frac{f_{TSC}}{f_{FPGA}}\right) - \delta \quad (1)$$

Where $f_{TSC}$ and $f_{FPGA}$ are the incrementation rates of the CPU and FPGA counters, and $t_{TSC}$ and $t_{FPGA}$ are the number of clock ticks recorded by the CPU and FPGA counters. Finally, $\delta$ is an offset between the CPU and FPGA tick counts measured during a calibration step, the calibration is described in further embodiments. $f_{TSC}$ can be found by interrogating the host operating system for the current CPU clock rate. The value of $f_{FPGA}$ is dependent on the FPGA implementation since a clock divider or multiplier may be applied to the 100 MHz PCIe clock within the FPGA, however it will be known by the FPGA circuit designer. In the case of the market data application, for example, the current value of the FPGA counter ($t_{FPGA}$) is stored at the time the input Ethernet packet enters the system in the header of the internal message(s) generated from this packet. Conversion of FPGA into TSC ticks is performed by the CPU using Equation (1), for example.

Another embodiment allows the value of $\delta$ to be found during a calibration step. Naively, $\delta$ can be expressed as follows in Equation (2) below:

$$\delta = u_{FPGA}\left(\frac{f_{TSC}}{f_{FPGA}}\right) - u_{TSC} \quad (2)$$

Where $u_{TSC}$ and $u_{FPGA}$ are the values of the CPU and FPGA counters at the same instant of calibration, with other symbols as previously defined.

In the practical example of the market data application, conversion of FPGA to TSC ticks is performed by the CPU, as is the calculation of $\delta$. At the instant of calibration, the CPU writes the current value of TSC to a first PCIe register on the FPGA, where it may later be read as $u_{TSC}$ by the CPU. This action triggers the current value of the FPGA counter to be latched into a second PCIe register, where it may later be read as $u_{FPGA}$ by the CPU. The fact of writing TSC value in the first register removes the variability linked with CPU recording and reading this value in its associated memory.

It should be noted that $u_{FPGA}$ is not then recorded at the same instant as $u_{TSC}$, there is a time difference equivalent to a PCIe register write between the readings. This can be accounted for as an additional term in the equation for $\delta$, as shown in Equation (3) below:

$$\delta = u_{FPGA}\left(\frac{f_{TSC}}{f_{FPGA}}\right) - t_{write}f_{TSC} - u_{TSC} \quad (3)$$

Where $t_{write}$ is the time taken for a PCIe write operation. The value of $t_{write}$ will depend on the PCIe implementation and CPU type. The value of $t_{write}$ can be problematic to measure, halving the time taken for a CPU write/read roundtrip will not be accurate since the time taken for PCIe register read and write roundtrips are non-symmetric.

A further embodiment allows the time for a PCIe write operation to be measured. First it is assumed that the time taken for a CPU to FPGA PCIe write is symmetric with an FPGA to CPU PCIe write. The state of the TSC is taken at the start of the procedure, and immediately a PCIe write is performed to the FPGA. This operation triggers the FPGA to perform a reply write to a known location in CPU memory. Meanwhile the CPU polls this location waiting for the FPGA write, as soon as it completed the state of the TSC is again recorded. The value of the $t_{write} f_{TSC}$ term in the equation for $\delta$ can then be approximated as follows in Equation (4):

$$t_{write}f_{TSC} \approx \frac{w_{TSC} - v_{TSC}}{2} \quad (4)$$

Where $w_{TSC}$ is the value of the TSC counter at the end of the procedure and $v_{TSC}$ is its value at the start.

In a final embodiment, latency in transmitting the value of the FPGA counter for each piece of data flowing through the system can be reduced. This is achieved by transmitting only the least significant bits of the counter representation. The most significant bits of the counter may be ignored since a process running on the CPU tracks when the remaining truncated counter bits wrap to zero and reinserts the missing most significant bits on the CPU side. The disadvantage of this approach is that it limits the maximum time that can be measure by the technique. However, in the case of the market data application the upper bound on compute time is known so the length of the FPGA truncated counter representation can be correctly sized.

Referring now to the drawings, wherein like reference numerals refer to like parts throughout, there is seen in FIG. 1 a system 100 for latency measurement from any two points in a combined FPGA and CPU processing system using a PCI Express bus as interconnect, according to an embodiment. According to this embodiment, system 100 comprises a FPGA 102, which can be, for example, a single FPGA, an FPGA matrix or array, and/or an FPGA node, among other embodiments of FPGA.

System 100 may be, for example, directed to a market data application, among many other applications. In one example, a conventional system for processing market feed data relies on conventional server based components. Such systems can employ conventional CPU architectures and communicate to process a market data feed and communicate the processed data. According to an embodiment, FPGA 102 can include one or more connections to one or more conventional CPU processing systems 104. In an example, information can be communicated to a CPU processing device to provide for analysis of the data received, data receive rates, data volume, and data delivery rates, among many other options. In some embodiments, downstream clients can interact with CPU processing device 104 to receive processed data, specific information on user defined symbols, and/or other user defined subsets of data delivered to the feed handler/matrix.

FIG. 1 illustrates just one example of a conventional CPU system 104, which includes a processor 108, a non-transitory computer readable storage medium 106, and a user interface 110. The processor 108 can be any type of processor, multiprocessor or controller, including but not limited to commercially available microprocessors.

The computer readable storage medium 106 may be, for example, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any combination of the foregoing. For example, computer readable storage medium 106 may contain or store a program for use by or in connection with the systems or methods described herein. Indeed, the instructions stored in the data storage may cause the processor 108 to perform one or more of the functions described herein.

User interface 110 may be any user interface that allows the user or a third party to input and/or obtain information from system 100, including but not limited to a monitor, display, mouse, keyboard, touchscreen, voice recognition sensor, and/or any of a wide variety of other components.

Components FPGA 102 and CPU 104 are in communication via PCIe 112, allowing the system 100 to send data between the components. PCIe 112 can include, for example, a 100 MHz clock is present, for example, although many other types of clocks are possible. The FPGA incorporates a counter which is incremented by a clock derived from this 100 MHz PCIe bus clock rather than one of its own internal clocks, as is typically implemented. The 100 MHz PCIe clock may be used directly to increment the counter on the FPGA, or it may pass through a further clock multiplier or divider.

According to an embodiment, CPU 104 or another CPU in communication with one or more components of system 100 is programmed, adapted, and/or configured to calculate latency measurements in system 100. For example, the CPU can include a computer readable storage medium 106 that contains or stores a program for use by or in connection with processor 108 to perform the following functions.

The program allows the value of the drift-free FPGA reference counter to be converted into TSC units. For example, when the FPGA/CPU system is initialized, the TSC and FPGA counters begin counting ticks independently. Since TSC and FPGA counters are derived from the same source there is no drift, FPGA ticks can be converted to TSC ticks using Equation (1).

Where $f_{TSC}$ and $f_{FPGA}$ are the incrementation rates of the CPU and FPGA counters, and $t_{TSC}$ and $t_{FPGA}$ are the number of clock ticks recorded by the CPU and FPGA counters. Finally, δ is an offset between the CPU and FPGA tick counts measured during a calibration step, the calibration is described in further embodiments. $f_{TSC}$ can be found by interrogating the host operating system for the current CPU clock rate. The value of $f_{FPGA}$ is dependent on the FPGA implementation since a clock divider or multiplier may be applied to the 100 MHz PCIe clock within the FPGA, however it will be known by the FPGA circuit designer. In the case of the market data application, for example, the current value of the FPGA counter ($t_{FPGA}$) is stored at the time the input Ethernet packet enters the system in the header of the internal message(s) generated from this packet. Conversion of FPGA into TSC ticks is performed by the CPU using Equation (1), for example.

The program also allows the value of δ to be found during a calibration step. Naively, δ can be expressed in Equation (2), where $u_{TSC}$ and $u_{FPGA}$ are the values of the CPU and FPGA counters at the same instant of calibration, with other symbols as previously defined.

In the practical example of the market data application, conversion of FPGA to TSC ticks is performed by the CPU, as is the calculation of δ. At the instant of calibration, the CPU writes the current value of TSC to a first PCIe register on the FPGA, where it may later be read as $u_{TSC}$ by the CPU. This action triggers the current value of the FPGA counter to be latched into another PCIe register, where it may later be read as $u_{FPGA}$ by the CPU. The fact of writing TSC value in the first register removes the variability linked with CPU recording and reading this value in its associated memory.

It should be noted that $u_{FPGA}$ is not then recorded at the same instant as $u_{TSC}$, there is a time difference equivalent to a PCIe register write between the readings. This can be accounted for as an additional term in the equation for δ, as shown in Equation (3), where $t_{write}$ is the time taken for a PCIe write operation. The value of $t_{write}$ will depend on the PCIe implementation and CPU type. The value of $t_{write}$ can be problematic to measure, halving the time taken for a CPU write/read roundtrip will not be accurate since the time taken for PCIe register read and write roundtrips are non-symmetric.

The program can also allow the time for a PCIe write operation to be measured. First it is assumed that the time taken for a CPU to FPGA PCIe write is symmetric with an FPGA to CPU PCIe write. The state of the TSC is taken at the start of the procedure, and immediately a PCIe write is performed to the FPGA. This operation triggers the FPGA to perform a reply write to a known location in CPU memory. Meanwhile the CPU polls this location waiting for the FPGA write, as soon as it completed the state of the TSC is again recorded. The value of the $t_{write} f_{TSC}$ term in the equation for δ can then be approximated as in Equation (4), where $w_{TSC}$ is the value of the TSC counter at the end of the procedure and $v_{TSC}$ is its value at the start.

Shown in FIG. 2 is a method 200 for measuring latency measurement between any two points in a combined FPGA and CPU processing system using a PCI Express bus as interconnect is disclosed. In step 202, a combined FPGA and CPU processing system using a PCI Express bus as interconnect is provided. The FPGA and CPU can be any of the embodiments described herein or otherwise envisioned, and can include any of the components of the FPGA and/or CPU described in conjunction with FIG. 1. For example, the PCIe bus can include a clock such as a 100 MHz clock, although many other types of clocks are possible. The CPU can include a clock such as a Time Stamp Counter (TSC), although many other types of clocks are possible. The FPGA can measure expired time within the FPGA itself by instantiating a regularly clocked counter, although many other types of clocks are possible. In some embodiments, the TSC and FPGA counters begin counting ticks independently when the FPGA/CPU system is initialized.

In step 204, the time increments of the FPGA are converted to the CPU time increments using Equation (1), where $f_{TSC}$ and $f_{FPGA}$ are the incrementation rates of the CPU and FPGA counters, and $t_{TSC}$ and $t_{FPGA}$ are the number of clock ticks recorded by the CPU and FPGA counters, and $\delta$ is an offset between the CPU and FPGA tick counts measured during a calibration step as described herein. Since TSC and FPGA counters are derived from the same source there is no drift, so FPGA ticks can be converted to TSC ticks.

According to an embodiment, $f_{TSC}$ can be found by interrogating the host operating system for the current CPU clock rate. The value of $f_{FPGA}$ is dependent on the FPGA implementation since a clock divider or multiplier may be applied to the 100 MHz PCIe clock within the FPGA, however it will be known by the FPGA circuit designer. In the case of the market data application, for example, the current value of the FPGA counter ($t_{FPGA}$) is stored at the time the input Ethernet packet enters the system in the header of the internal message(s) generated from this packet.

At step 206, the value of $\delta$ is determined during a calibration step using Equation (2), where $u_{TSC}$ and $u_{FPGA}$ are the values of the CPU and FPGA counters at the same instant of calibration, with other symbols as previously defined.

In some embodiments, conversion of FPGA to TSC ticks is performed by the CPU, as is the calculation of $\delta$. At the instant of calibration, the CPU writes the current value of TSC to a first PCIe register on the FPGA, where it may later be read as $u_{TSC}$ by the CPU. This action triggers the current value of the FPGA counter to be latched into another PCIe register, where it may later be read as $u_{FPGA}$ by the CPU. The fact of writing TSC value in the first register removes the variability linked with CPU recording and reading this value in its associated memory. If $u_{FPGA}$ is not recorded at the same instant as $u_{TSC}$, there is a time difference equivalent to a PCIe register write between the readings. This can be accounted for as an additional term in the equation for $\delta$, as shown in Equation (3) where $t_{write}$ is the time taken for a PCIe write operation. The value of $t_{write}$ will depend on the PCIe implementation and CPU type. The value of $t_{write}$ can be problematic to measure, halving the time taken for a CPU write/read roundtrip will not be accurate since the time taken for PCIe register read and write roundtrips are non-symmetric.

At step 208, the time for a PCIe write operation can be measured. First, it is assumed that the time taken for a CPU to FPGA PCIe write is symmetric with an FPGA to CPU PCIe write. The state of the TSC is taken at the start of the procedure, and immediately a PCIe write is performed to the FPGA. This operation triggers the FPGA to perform a reply write to a known location in CPU memory. Meanwhile the CPU polls this location waiting for the FPGA write, as soon as it completed the state of the TSC is again recorded. The value of the $t_{write} f_{TSC}$ term in the equation for $\delta$ can then be approximated as in Equation (4), where $w_{TSC}$ is the value of the TSC counter at the end of the procedure and $v_{TSC}$ is its value at the start.

According to one embodiment, latency in transmitting the value of the FPGA counter for each piece of data flowing through the system can be reduced. This is achieved by transmitting only the least significant bits of the counter representation. The most significant bits of the counter may be ignored since a process running on the CPU tracks when the remaining truncated counter bits wrap to zero and reinserts the missing most significant bits on the CPU side. The disadvantage of this approach is that it limits the maximum time that can be measure by the technique. However, in the case of the market data application the upper bound on compute time is known so the length of the FPGA truncated counter representation can be correctly sized.

Although the present invention has been described in connection with a preferred embodiment, it should be understood that modifications, alterations, and additions can be made to the invention without departing from the scope of the invention as defined by the claims.

What is claimed is:

1. A method for determining latency across a bus coupling a field programmable gate array (FPGA) comprising a first counter having first clock ticks with a first incrementation rate, to a processor comprising a second counter having second clock ticks with a second incrementation rate, wherein said first and second incrementation rates are not equal, the method comprising the steps of:
  counting, by said first counter, a first plurality of first clock ticks;
  counting, by said second counter, a first plurality of second clock ticks, wherein the first counter is clocked by a first clock and the second counter is clocked by a second clock, the first clock and second clock being derived from the same clock source such that there is no drift between the first clock and second clock;
  determining a calibration offset, the calibration offset being a difference in a value of the first counter and a value of the second counter at a point of calibration;
  sending the first plurality of first clock ticks to the processor across the bus;
  converting, using said first and second incrementation rates and the determined calibration offset, the first plurality of first clock ticks to a second plurality of second clock ticks;
  determining the difference between the second plurality of second clock ticks and the first plurality of second clock ticks; and
  evaluating the performance of the processing through the FPGA, the bus, and the processor, using the determined time difference.

2. The method of claim 1, wherein said FPGA receives a signal representative of the clock source over the bus, the first clock being derived from the clock source based on the signal received over the bus.

3. The method of claim 1, wherein said calibration offset is determined using the following equation:

$$\delta = u_{FPGA}\left(\frac{f_{TSC}}{f_{FPGA}}\right) - u_{TSC}$$

where $\delta$ is said calibration offset, $u_{FPGA}$ is a value of said first counter at said point of calibration, $u_{TSC}$ is a value of said second counter at said point of calibration, $f_{FPGA}$ is said first incrementation rate, and $f_{TSC}$ is said second incrementation rate.

4. The method of claim 1, wherein said first plurality of first clock ticks are converted to a second plurality of second clock ticks using the equation:

$$t_{TSC} = t_{FPGA}\left(\frac{f_{TSC}}{f_{FPGA}}\right) - \delta$$

where $\delta$ is said calibration offset, $t_{FPGA}$ is said first plurality of first clock ticks, $t_{TSC}$ is said second plurality of second clock ticks, $f_{FPGA}$ is said first incrementation rate, and $f_{TSC}$ is said second incrementation rate.

5. The method of claim 1, further comprising the step of: determining a bus write time as a component of said calibration offset.

6. The method of claim 5, wherein said calibration offset is determined using the equation:

$$\delta = u_{FPGA}\left(\frac{f_{TSC}}{f_{FPGA}}\right) - t_{write}f_{TSC} - u_{TSC}$$

where $\delta$ is said calibration offset, $t_{write}$ said bus write time, $u_{FPGA}$ is a value of said first counter at said point of calibration, $u_{TSC}$ is a value of said second counter at said point of calibration, $f_{FPGA}$ is said first incrementation rate, and $f_{TSC}$ is said second incrementation rate.

7. The method of claim 6, wherein $t_{write}$ $f_{TSC}$ is approximated using the equation:

$$t_{write}f_{TSC} \approx \frac{w_{TSC} - v_{TSC}}{2}$$

where $v_{TSC}$ is a value of the second counter when a bus write procedure is initiated, and $w_{TSC}$ is a value of the second counter when a bus write procedure is completed.

8. The method of claim 1, wherein said processor determines said time difference.

9. The method of claim 1, wherein each of said first clock ticks comprise a one or more significant bits, and only said significant bits are transmitted.

10. A method for determining latency across a bus coupling a field programmable gate array (FPGA) comprising a first counter having first clock ticks with a first incrementation rate, to a processor comprising a second counter having second clock ticks with a second incrementation rate, wherein said first and second incrementation rates are not equal, the method comprising the steps of:
  initializing said first counter to count a first plurality of first clock ticks;
  initializing said second counter to count a first plurality of second clock ticks, wherein the first counter is clocked by a first clock and the second counter is clocked by a second clock, the first clock and second clock being derived from the same clock source such that there is no drift between the first clock and second clock;
  determining a calibration offset, the calibration offset being a difference in a value of the first counter and a value of the second counter at a point of calibration, using the following equation:

$$\delta = u_{FPGA}\left(\frac{f_{TSC}}{f_{FPGA}}\right) - u_{TSC}$$

where $\delta$ is said calibration offset, $u_{FPGA}$ is a value of said first counter at said point of calibration, $u_{TSC}$ is a value of said second counter at said point of calibration, $f_{FPGA}$ is said first incrementation rate, an $df_{TSC}$ is said second incrementation rate;
  sending the first plurality of first clock ticks to the processor across the bus;
  converting the first plurality of first clock ticks to a second plurality of second clock ticks using the equation:

$$t_{TSC} = t_{FPGA}\left(\frac{f_{TSC}}{f_{FPGA}}\right) - \delta$$

where $\delta$ is said calibration offset, $t_{FPGA}$ is said first plurality of first clock ticks, $t_{TSC}$ is said second plurality of second clock ticks, $f_{FPGA}$ is said first incrementation rate, and $f_{TSC}$ is said second incrementation rate;
  determining the difference between the second plurality of second clock ticks and the first plurality of second clock ticks; and
  evaluating the performance of the processing through the FPGA, the bus, and the processor, using the determined time difference.

11. The method of claim 10, wherein said FPGA receives a signal representative of the clock source over the bus, the first clock being derived from the clock source based on the signal received over the bus.

12. The method of claim 10, further comprising the step of:
  determining a bus write time as a component of said calibration offset.

13. The method of claim 12, wherein said calibration offset is determined using the equation:

$$\delta = u_{FPGA}\left(\frac{f_{TSC}}{f_{FPGA}}\right) - t_{write}f_{TSC} - u_{TSC}$$

where $\delta$ is said calibration offset, $t_{write}$ is said bus write time, $u_{FPGA}$ is a value of said first counter at said point of calibration, $u_{TSC}$ is a value of said second counter at said point of calibration, $f_{FPGA}$ is said first incrementation rate, and $f_{TSC}$ is said second incrementation rate.

14. The method of claim 13, wherein $t_{write}$ $f_{TSC}$ is approximated using the equation:

$$t_{write}f_{TSC} \approx \frac{w_{TSC} - v_{TSC}}{2}$$

where $v_{TSC}$ is a value of the second counter when a bus write procedure is initiated, and $w_{TSC}$ is a value of the second counter when a bus write procedure is completed.

15. The method of claim 10, wherein each of said first clock ticks comprise a one or more significant bits, and only said significant bits are transmitted.

16. A system for determining latency across a bus, the system comprising:
  a field programmable gate array (FPGA) comprising a first counter having first clock ticks with a first incrementation rate, wherein said first counter is programmed to count a first plurality of first clock ticks;

a processor comprising a second counter having second clock ticks with a second incrementation rate, wherein said first and second incrementation rates are not equal, the second counter programmed to count a first plurality of second clock ticks, wherein the first counter is clocked by a first clock and the second counter is clocked by a second clock, the first clock and second clock being derived from the same clock source such that there is no drift between the first clock and second clock; and a bus coupling said FPGA and said processor, the first plurality of first clock ticks being sent to the processor across the bus;

wherein said processor is programmed to:

determine a calibration offset, the calibration offset being a difference in a value of the first counter and a value of the second counter at a point of calibration; and convert, using said first and second incrementation rates and the determined calibration offset, the first plurality of first clock ticks to a second plurality of second clock ticks;

determine the difference between the second plurality of second clock ticks and the first plurality of second clock ticks, evaluate the performance of the processing through the FPGA, the bus, and the processor, using the determined time difference.

17. The system of claim 16, wherein said calibration offset is determined using the following equation:

$$\delta = u_{FPGA}\left(\frac{f_{TSC}}{f_{FPGA}}\right) - u_{TSC}$$

where δ is said calibration offset, $u_{FPGA}$ is a value of said first counter at said point of calibration, $u_{TSC}$ is a value of said second counter at said point of calibration, $f_{FPGA}$ is said first incrementation rate, an $df_{TSC}$ is said second incrementation rate.

18. The system of claim 16, wherein said first plurality of first clock ticks are converted to the second plurality of second clock ticks using the equation:

$$t_{TSC} = t_{FPGA}\left(\frac{f_{TSC}}{f_{FPGA}}\right) - \delta$$

where δ is said calibration offset, $t_{FPGA}$ is said first plurality of first clock ticks, $t_{TSC}$ is said second plurality of second clock ticks, $f_{FPGA}$ is said first incrementation rate, and $f_{TSC}$ is said second incrementation rate.

19. A non-transitory storage medium comprising a computer program product stored thereon, the computer program product comprising instructions to:

count a plurality of first clock ticks by a field programmable gate array (FPGA) counter having a first incrementation rate;

count a plurality of second clock ticks by a processor counter having a second incrementation rate, wherein said first and second incrementation rates are not equal, and wherein said FPGA and said processor are coupled by a bus, wherein the first counter is clocked by a first clock and the second counter is clocked by a second clock, the first clock and second clock being derived from the same clock source such that there is no drift between the first clock and second clock;

determine a calibration offset, the calibration offset being a difference in a value of the first counter and a value of the second counter at a point of calibration;

send the first plurality of first clock ticks to the processor across the bus;

convert, using said first and second incrementation rates and the determined calibration offset, the first plurality of first clock ticks to a second plurality of second clock ticks; and determine the difference between the second plurality of second clock ticks and the first plurality of second clock ticks; and evaluate the performance of the processing through the FPGA, the bus, and the processor, using the determined time difference.

20. The non-transitory storage medium of claim 19, wherein said calibration offset is determined using the following equation:

$$\delta = u_{FPGA}\left(\frac{f_{TSC}}{f_{FPGA}}\right) - u_{TSC}$$

where δ is said calibration offset, $u_{FPGA}$ is a value of said FPGA counter at a point of calibration, $u_{TSC}$ is a value of said processor counter at said point of calibration, $f_{FPGA}$ is said first incrementation rate, an $df_{TSC}$ is said second incrementation rate.

21. The non-transitory storage medium of claim 19, wherein said first plurality of first clock ticks are converted to said second plurality of second clock ticks using the equation:

$$t_{TSC} = t_{FPGA}\left(\frac{f_{TSC}}{f_{FPGA}}\right) - \delta$$

where δ is said calibration offset, $t_{FPGA}$ is said first plurality of first clock ticks, $t_{TSC}$ is said second plurality of second clock ticks, $f_{FPGA}$ is said first incrementation rate, and $f_{TSC}$ is said second incrementation rate.

* * * * *